(12) United States Patent
Richter

(10) Patent No.: US 6,255,756 B1
(45) Date of Patent: *Jul. 3, 2001

(54) WINDING ARRANGEMENT FOR SWITCHED RELUCTANCE MACHINE BASED INTERNAL STARTER GENERATOR

(75) Inventor: Eike Richter, Cincinnati, OH (US)

(73) Assignee: General Electric Company, Cincinnati, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,002

(22) Filed: Dec. 1, 1997

(51) Int. Cl.⁷ .................. H02K 3/00; H02K 3/04
(52) U.S. Cl. .................. 310/208; 336/208; 29/605; 140/92.1; 140/92.2; 240/432
(58) Field of Search .................. 310/208, 179, 310/195, 194, 203; 335/213, 250, 282, 299; 29/605; 336/222, 223, 224, 225, 221, 189, 208, 190; 140/92.1, 92.2; 242/432, 432.5, 441.1

(56) References Cited

U.S. PATENT DOCUMENTS

| | | | |
|---|---|---|---|
| 1,451,374 | * 4/1923 | Rogers | 140/92.2 |
| 3,802,066 | 4/1974 | Barrett . | |
| 3,851,830 | * 12/1974 | Barthalon | 336/189 |
| 4,131,988 | * 1/1979 | Finegold | 29/596 |
| 4,668,544 | * 5/1987 | Takahashi | 428/593 |
| 4,684,867 | 8/1987 | Miller et al. . | |
| 4,967,464 | 11/1990 | Stephens . | |
| 5,376,851 | 12/1994 | Lipo et al. . | |

* cited by examiner

Primary Examiner—Karl Tamai
(74) Attorney, Agent, or Firm—Andrew C. Hess; Rodney M. Young

(57) ABSTRACT

A stator coil winding arrangement comprises an inner layer and an outer layer, which define the two layers of the coil. A first turn of the inner layer is positioned directly over the outer layer. All subsequent turns of the inner layer return to the inner layer to be positioned over the inner layer. With this winding arrangement, total losses in the stator coil are reduced by approximately a factor of two.

15 Claims, 4 Drawing Sheets

WINDING ARRANGEMENT FOR SWITCHED RELUCTANCE MACHINE BASED INTERNAL STARTER GENERATOR

TECHNICAL FIELD

The present invention relates, in general to coil winding arrangements and more particularly to a winding arrangement for an internal starter generator based in a switched reluctance machine.

The invention herein described was made in the performance of work done under Air Force Contract No. F33615-94-C-2504, awarded by the Department of the U.S. Air Force under which the U.S. Government has certain rights.

BACKGROUND OF THE INVENTION

Eddy current losses tend to exceed the $I^2R$ losses in high speed, high power switched reluctance machines as will be utilized for internal jet-engine starter-generators. These machines are characterized by a low number of turns per phase made from rectangular, hollow conductors with outside dimensions of typically 0.090 inch by 0.125 inch or larger. These conductors are exposed to high magnetic fields which change amplitude very rapidly at a rate of typically more than 1000 Hz. the electrical losses in the conductors, generally called $I^2R$ losses, are much larger than the losses calculated by multiplying the square of the rms value of the winding current times the DC resistance of the conductor. These additional losses are due to eddy currents induced by the rapidly changing magnetic field in the solid walls of the conductor. Normally these eddy current losses are between 10 to 800% of the $DCI^2R$ losses. However, in high speed, high power switched reluctance machines, the additional losses due to the eddy currents can be a multiple of the $DCI^2R$ losses. Applying the same machine type to an internal starter/generator, the power rating and the fundamental frequency can readily be higher than for an external starter generator, potentially resulting in very high eddy current losses.

High eddy current losses introduce a number of challenges. For example, the cooling required by the high eddy current losses challenges the conventional cooling system for which standard engine lubrication oil is used. Also, the adverse impact on efficiency of the system becomes rather significant with high eddy current losses.

It would be desirable, then, to be able to reduce the eddy current losses in internal starter/generator arrangements.

SUMMARY OF THE INVENTION

The present invention provides for loss reduction by specific stator coil placement and winding arrangement. In the prior art, the first turn of the winding of the coil is directly on top of the second turn in the inside layer of the coil. With the coil configuration of the present invention, the first turn is moved to the outside, over the second layer; the wire, after completing the first turn, then returns to the inner layer. The winding arrangement according to the present invention provides major eddy current loss reduction/prevention compared to the conventional winding arrangement, without any significant weight and size impact.

In accordance with one aspect of the present invention, a stator coil winding arrangement comprises an inner layer and an outer layer which define two layers of the coil. A first turn of the inner layer is moved radially outward, out of the inner layer to be in a vertical plane with the outer layer, parallel with the inner layer and a subsequent turn of the inner layer is positioned over the inner layer.

In the drawings as hereinafter described, a preferred embodiment is depicted; however, various other modifications and alternative constructions can be made thereto without departing from the true spirit and scope of the invention.

BRIEF DESCRIPTION OF THE DRAWING

The novel features of the invention are set forth with particularity in the appended claims. The invention itself, however, both as to organization and method of operation, together with objects and advantages thereof, may best be understood by reference to the following description taken in conjunction with the accompanying drawing in which:

DETAILED DESCRIPTION OF THE INVENTION

The present invention will be described with respect to winding arrangements for switched reluctance machine based internal starter generators; those skilled in the art, however, will recognize that the principles of the present invention could be easily adapted or modified for use on a variety of components.

The present invention results in major eddy current loss reduction/prevention for internal starter/generators based in switched reluctance machines. To reduce eddy current losses, conventional wisdom dictates using smaller, hollow conductors in parallel. That, however, becomes very quickly impractical because of the very expensive fabrication procedures necessary for these types of coils. Also, since these coils are located in rather wide and open slots, the eddy current effects are more pronounced than in conventional high power machines with deep and narrow slots.

Figure 1A:
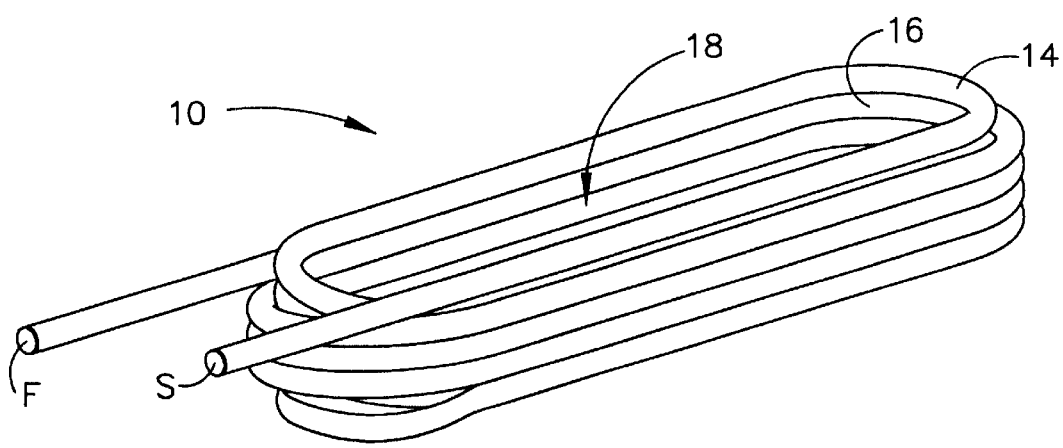
FIGS. 1A and 2A illustrate an isometric view and front view, respectively, of a conventional coil winding arrangement.
Figure 1B:
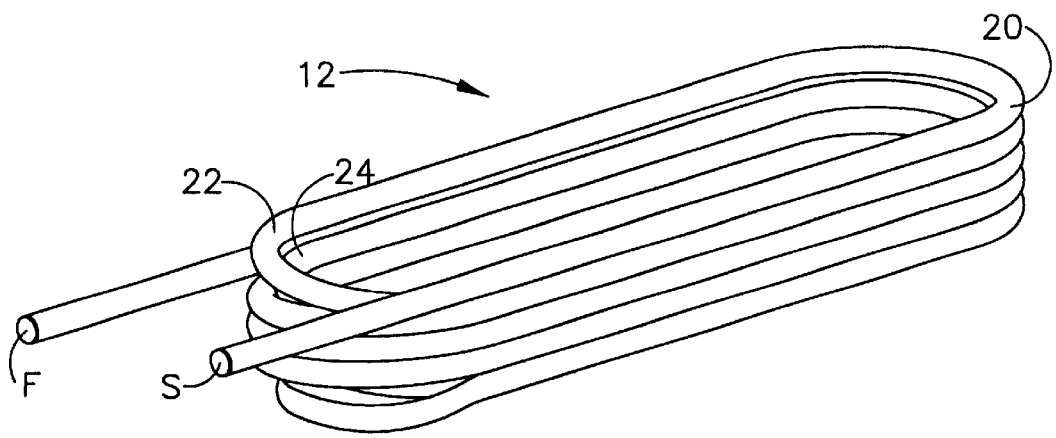
FIGS. 1B and 2B illustrate an isometric view and front view, respectively, of a coil winding arrangement in accordance with the present invention.
Figure 2A:
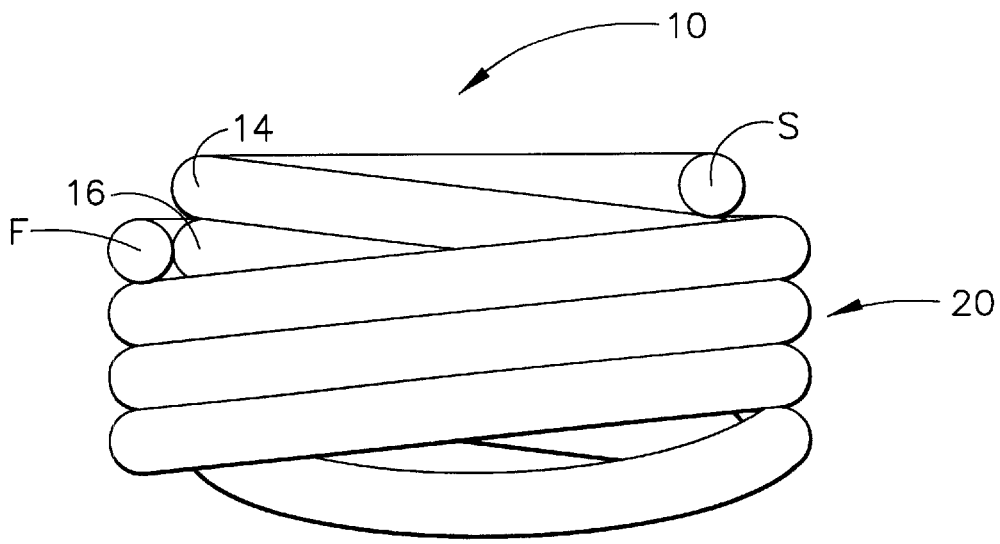
Figure 2B:
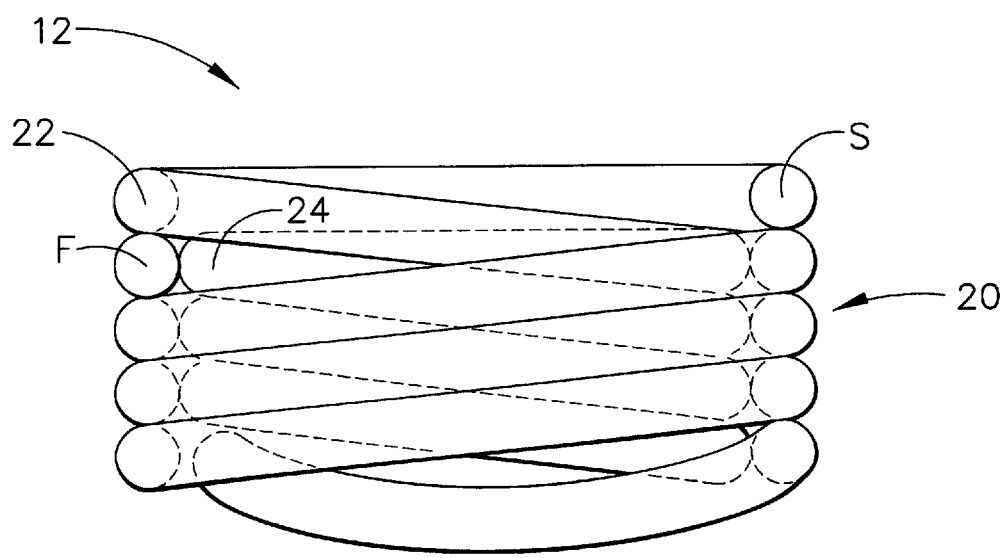

Referring to the drawings, FIGS. 1A and 2A illustrate conventional stator coil winding arrangements 10; while FIGS. 1B and 2B illustrate stator coil winding arrangements 12 wound in accordance with the teachings of the present invention. The coil winding arrangements 10 and 12 start at point S and end at point F. Typically, these coils are wound as two layer coils having an outer layer with one less turn than the inner layer, for winding reasons. In the prior art, illustrated in FIGS. 1A and 2A, a first turn 14 of the winding of the coil 10 is directly on top of second turn 16 in inside layer 18 of the coil 10.

With the coil configuration of the present invention, illustrated in FIGS. 1B and 2B, top turn 22, which is positioned in the same vertical plane as the inner layer 18 in the prior art, and which is close to the stator pole top (not shown), is actually moved radially outward, and positioned in the same vertical plane as, or directly on top of, as is illustrated in FIG. 1B outer layer 20. This results in a space beneath the first turn being completely vacant. Hence, the first position in a vertical plane with the inner layer is untenanted. After completing the first turn 22, the coil returns to the inner layer 18 in the second turn 24 and subsequent plurality of turns 24a.

The winding arrangement of the present invention is feasible and does not require any increased slot depth. Therefore, the winding arrangement of the present invention has the advantage of having little or no weight impact. The total losses in the coil are reduced by almost a factor of two, as predicted by time stepping finite element analysis, known and understood by persons skilled in the art.

Figure 3:
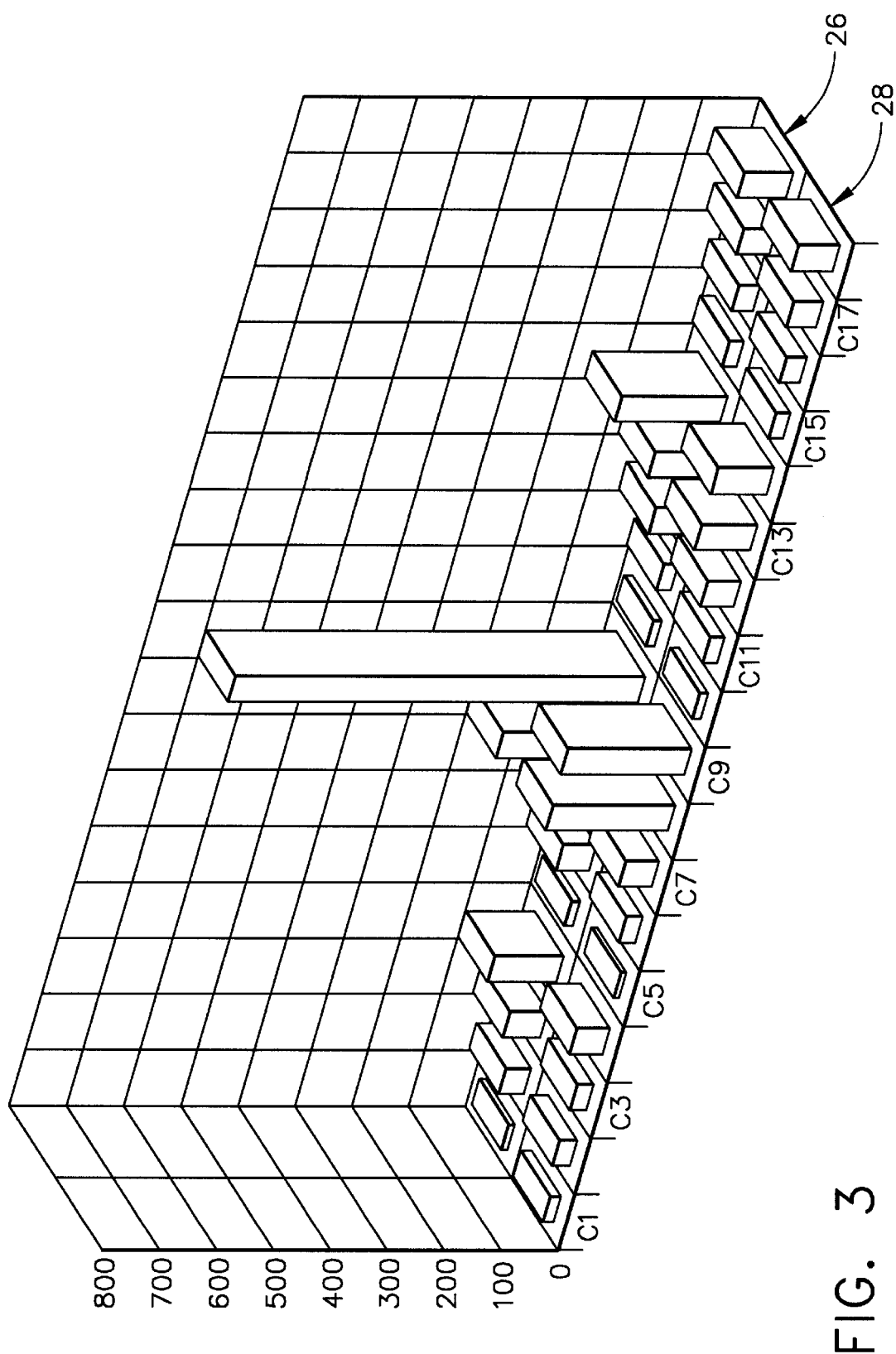
FIG. 3 is a graph comparing distribution of eddy current losses over different conductors wound as in FIGS. 1A and 2A, to losses over conductors wound in accordance with the present invention as shown in FIGS. 1B and 2B.

The distribution of the losses over the different conductors for two nine turn coils wound in the conventional manner and wound in accordance with the present invention are compared in FIG. 3. In FIG. 3, different conductors are positioned along the X-axis, and corresponding eddy current losses, measured as W/in, are measured along the Y-axis. Conductor row 26 illustrates the loss distribution for conventional coil winding arrangements, while conductor row 28 illustrates the loss distribution for coil winding arrangements in accordance with the present invention. In FIG. 3, conductors C9 and C14 are located at the top of the stator pole (one on each side).

It is clear from FIG. 3 that not only are the losses in the top conductor (C9 and C14) reduced, but because of the changed flux distribution, the majority of the conductors show a reduction in total losses, when wound in accordance with the present invention. Consequently, the present invention allows a major eddy current loss reduction/prevention, as compared to convention stator coil winding arrangements, without any significant weight and size impact.

Figure 4:
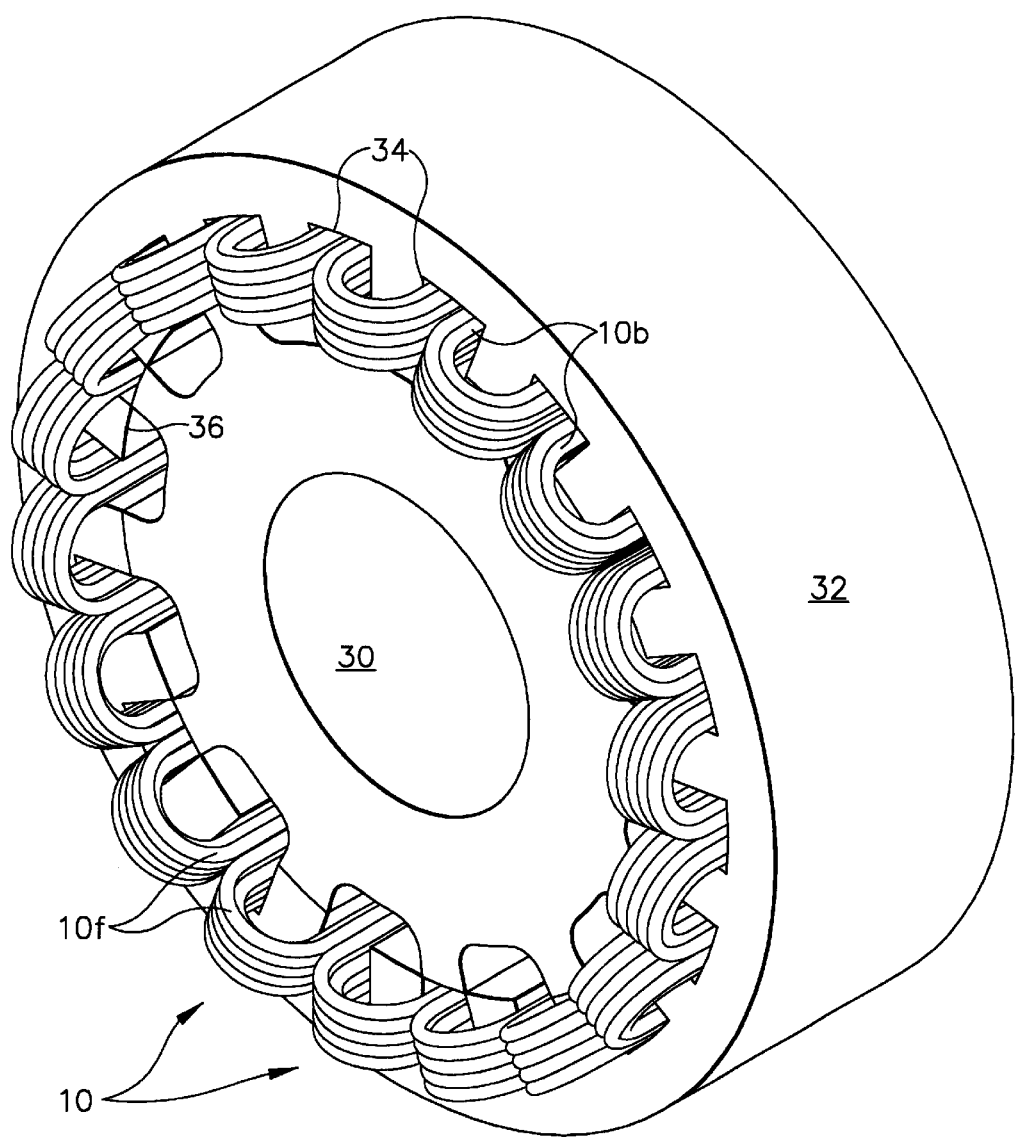
FIG. 4 illustrates an application of the coil winding arrangement of the present invention, with switched reluctance machine electromagnetics.

In FIG. 4, the electromagnetics of a switched reluctance machine are shown with rotor core 30 and stator electromagnetics of stator core 32, to illustrate a typical application of the coils of the present invention, and their orientation. The coils 10 are embedded in large slots 34 in the stator and wound around individual teeth or poles 36. The top 10t of each coil is located adjacent to the air gap between the rotor and stator cores 30 and 32, respectively. The bottom 10b of each coil is located adjacent to the bottom of the slot 34 in the stator core. Because of the wide open slots, the top 10t of any coil is exposed to rather high magnetic field levels which, in turn, are responsible for eddy current losses. The coil winding arrangement according to the present invention results in major eddy current loss reduction/prevention for internal starter/generators based in switched reluctance machines.

While preferred embodiments of the present invention have been shown and described herein, it will be obvious to those skilled in the art that such embodiments are provided by way of example only. Numerous variations, changes, and substitutions will now occur to those skilled in the art without departing from the invention, and those skilled in the art will recognize that the principles of the present invention could be easily adapted or modified to achieve goals in various arrangements. In particular, the two layer coil arrangement of the present invention is applicable to any coil where the top turns are exposed to high flux density fields, changing at frequencies above 100 Hertz. Accordingly, it is intended that the invention be limited only by the spirit and scope of the appended claims.

What is claimed is:

1. A stator coil winding arrangement comprising:
   an inner layer and an outer layer defining two layers of the coil;
   a first turn positioned to lie in a vertical plane with the outer layer, whereby a first position in a vertical plane with the inner layer is completely vacant;
   a second turn positioned to lie in a second position of the vertical plane with the inner layer; and
   subsequent turns positioned to lie in a vertical plane with the inner layer, whereby total losses in the stator coil are reduced by at least approximately a factor of two.

2. A stator coil winding arrangement as claimed in claim 1 wherein the vacant first position in the vertical plane with the inner layer results in a changed flux distribution.

3. A stator coil winding arrangement as claimed in claim 1 wherein the stator coil is associated with a stator and is embedded in a slot in the stator and wound around individual poles.

4. A stator coil winding arrangement as claimed in claim 3 wherein a top portion of each coil is located adjacent an air gap.

5. A stator coil winding arrangement as claimed in claim 3 wherein a bottom portion of each coil is located adjacent to the slot in the stator.

6. A stator coil winding arrangement as claimed in claim 1 wherein the winding arrangement is adaptable for switched reluctance machine based internal starter generators.

7. A stator coil winding arrangement for a switched reluctance machine based internal starter generator having a stator core and a rotor core, the winding arrangement comprising:
   an inner layer and an outer layer defining two layers of the coil;
   a first turn positioned to lie in a vertical plane with the outer layer, whereby the first turn is moved away from the stator core so that a first position in a vertical plane with the inner layer is completely vacant;
   a second turn positioned to lie in a second position of the vertical plane with the inner layer; and
   subsequent turns positioned to lie in a vertical plane with the inner layer, whereby total losses in the stator coil are reduced by at least approximately a factor of two.

8. A stator coil winding arrangement as claimed in claim 7 wherein the vacant first position in the vertical plane with the inner layer results in a changed flux distribution.

9. A stator coil winding arrangement as claimed in claim 1 wherein the stator coil is embedded in a slot in the stator core and wound around individual poles.

10. A stator coil winding arrangement as claimed in claim 9 wherein a top portion of each coil is located adjacent an air gap between the rotor core and the stator core.

11. A stator coil winding arrangement as claimed in claim 9, wherein a bottom portion of each coil is located adjacent to the slot in the stator core.

12. A method for winding a stator coil comprising the steps of:
   defining two layers of the coil as an inner layer and an outer layer;
   positioning a first turn to lie in a vertical plane with the outer layer, whereby a first position in a vertical plane with the inner layer is completely vacant;
   positioning a second turn to lie in a second position of the vertical plane with the inner layer; and
   positioning subsequent turns to lie in a vertical plane with the inner layer, whereby total losses in the stator coil are reduced by at least approximately a factor of two.

13. A method as claimed in claim 12 wherein the vacant first position in the vertical plane with the inner layer results in a changed flux distribution.

14. A method as claimed in claim 12 wherein the stator coil is associated with a stator and is embedded in a slot in the stator and wound around individual poles.

15. A method as claimed in claim 12 wherein the winding arrangement is adaptable for switched reluctance machine based internal starter generators.

* * * * *